March 25, 1952     J. D. WILTSHIRE     2,590,285

NESTING MARKETING CARRIER

Filed Aug. 26, 1949

INVENTOR
JAMES D. WILTSHIRE
BY *Wm. H. Dean*
AGENT

Patented Mar. 25, 1952

2,590,285

UNITED STATES PATENT OFFICE 2,590,285

NESTING MARKETING CARRIER

James D. Wiltshire, Hemet, Calif.

Application August 26, 1949, Serial No. 112,602

3 Claims. (Cl. 280—50)

My invention relates to a nesting marketing carrier having a pivoted upper basket, and the objects of my invention are:

First, to provide a marketing carrier of this class in which the upper basket thereof is pivoted upwardly and backwardly so that it may be readily moved out of superimposed position with the lowermost basket for conveniently and progressively unloading the marketing carrier without disconnecting, lifting or raising any of the loaded baskets of the carrier when checking the various items therein;

Second, to provide a marketing carrier of this class having a pivoted upper basket which, when pivoted into vertical position, maintains its bottom portion foremost and in nested relationship with adjacent nested marketing carriers;

Third, to provide a marketing carrier of this class in which the uppermost basket thereof is pivoted and provided with detent means for holding the same in certain position other than the horizontal position when unloaded;

Fourth, to provide a nesting marketing carrier having a pivoted upper basket, which greatly facilitates all checking and unloading of groceries or the like at the checking stand of a market;

Fifth, to provide a marketing carrier of this class which greatly reduces the labor involved in handling the groceries or the like, which are brought to the checking stand in a market;

Sixth, to provide a nesting marketing carrier having a pivoted upper basket which has greatly increased carrying capacity, combined with nesting features which are at all times mechanically unitary; and Seventh, to provide a nesting marketing carrier having a pivoted upper basket which is very simple and economical of construction, efficient in operation, and which will not readily deteriorate or get out of order.

Figure 1:
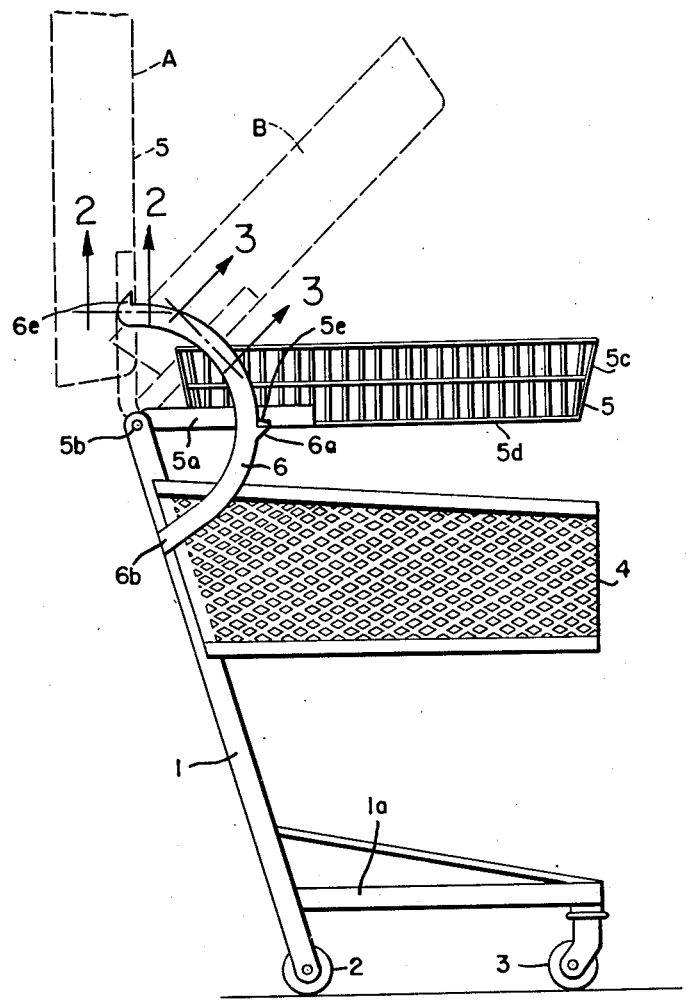
Figure 2:
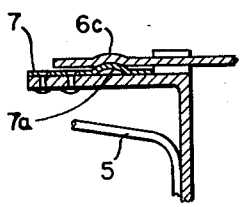
Figure 3:
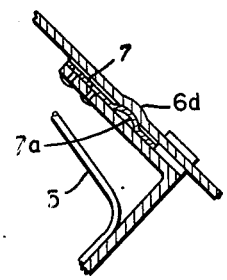

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my nesting marketing carrier, having a pivoted upper basket, illustrating by dash lines varying positions of the pivoted upper basket; Fig. 2 is an enlarged fragmentary sectional view, taken from the line 2—2 of Fig. 1, showing by solid lines the elevated position of the basket adjacent to the supporting bracket; Fig. 3 is an enlarged fragmentary sectional view, taken from the line 3—3 of Fig. 1, showing by solid lines an elevated position of the basket, and detent means relative to the supporting bracket.

Similar characters of reference refer to similar parts and portions throughout the several views of the drawings.

The frame 1, wheels 2, casters 3, stationary basket 4, pivoted basket 5, bracket 6 and the detent 7 constitute the principal parts and portions of my nesting marketing carrier having a pivoted upper basket.

The frame 1 is a conventional nesting marketing carrier frame, provided with wheels 2 and casters 3 supporting the same, as shown best in Fig. 1 of the drawings. This frame 1 is provided with a platform 1a on which an additional basket may be supported if desired. The stationary basket 4 is arranged in cantilever connected relationship with the frame 1 and is a conventional nesting basket, having a conventional pivoted rear end. The pivoted basket 5 is provided with a pair of arm portions 5a pivoted to the upper end portions of the frame 1 by means of pins 5b. This pivoted basket 5 is provided with downwardly converging side portions 5c and an enclosed bottom 5d.

Fixed to the arms 5a are lugs 5e which engage buttress stop portions 6a of the arcuate brackets 6, which are fixed at their end portions 6b to the frame 1 at opposite sides thereof. These brackets 6 are provided with offset portions 6c and 6d, engageable by the detents 7 at opposite sides of the basket 5, secured on the arms 5a. The upper end portions of the brackets 6 are provided with buttress stop portions 6e engageable with the lugs 5e of the arms 5a of the basket 5. The detents 7 are plate spring detents, fixed to the arms 5a of the basket 5, and these detents are provided with offset portions 7a, which engage the portions 6c and 6d of the brackets 6, for maintaining the basket 5 when in unloaded condition in either of the dash line positions A or B, respectively, as shown in Fig. 1 of the drawings.

The operation of my nesting marketing carrier having pivoted upper basket is substantially as follows: When the carrier, as shown in Fig. 1 of the drawings by solid lines, is used by a customer in a market, the stationary basket 4 and the pivoted basket 5 may be loaded as desired, by first filling the stationary basket 4 and then the pivoted basket 5, which may be raised at any time to accommodate the placement of a large package of groceries or the like in the stationary basket 4. When the marketing carrier is rolled to a position adjacent the checking stand in a market, the contents of the pivoted upper basket 5 may be first removed by the checking stand operator, then the basket 5 may be raised to the dash line position A or B, as desired, and then the groceries or other items may be removed from the stationary basket 4 without the necessity of raising either of the baskets when loaded. When the upper pivoted basket 5 is in the dash line position A, as shown in Fig. 1 of the drawings, the nesting marketing carrier is so disposed that it may be nested with other similar carriers in the conventional manner, whereby the open side of the basket 5 is in vertical position, adapted to receive the basket 5 of the next rearmost marketing carrier.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a nesting marketing carrier, a frame, caster wheels supporting said frame, a stationary basket, and a pivoted basket arranged in superimposed relationship to said stationary basket, and pivotal out of superimposed relationship with said stationary basket, whereby said stationary basket is accessible from the upper side thereof, arcuate brackets at opposite sides of said pivoted basket, stop means thereon and detent means on said brackets and connectible with said pivoted basket for maintaining said pivoted basket in elevated position relative to said stationary basket.

2. A marketing carrier, comprising a frame, a stationary basket, and a pivoted basket positioned over said stationary basket, adapted to be pivoted out of interfering relationship with the upper side of said stationary basket, arcuate bracket means at opposite sides of said pivoted basket, having stop portions thereon, and means connected to said pivoted basket engageable with said stop means for supporting said pivoted basket in horizontal position over said stationary basket.

3. A marketing carrier, comprising a frame, a stationary basket, and a pivoted basket positioned over said stationary basket, adapted to be pivoted out of interfering relationship with the upper side of said stationary basket, arcuate bracket means at opposite sides of said pivoted basket, having stop portions thereon, and means connected to said pivoted basket engageable with said stop means for supporting said pivoted basket in horizontal position over said stationary basket, detent means on said bracket and on said pivoted basket for supporting said pivoted basket in elevated position relative to said stationary basket.

JAMES D. WILTSHIRE.

REFERENCES CITED

The following references are of record in the file of this patent:

UNITED STATES PATENTS

| Number | Name | Date |
|---|---|---|
| 2,141,881 | Schray | Dec. 27, 1938 |
| 2,212,053 | Smith | Aug. 20, 1940 |